(12) United States Patent
Mattison et al.

(10) Patent No.: US 12,483,649 B1
(45) Date of Patent: Nov. 25, 2025

(54) SMARTPHONE PRIVACY SYSTEM AND METHOD OF USE

(71) Applicants: Jennifer Eileen Mattison, Sebring, FL (US); Michael Brian Mattison, Sr., Sebring, FL (US); Michael Brian Mattison, Jr., Sebring, FL (US)

(72) Inventors: Jennifer Eileen Mattison, Sebring, FL (US); Michael Brian Mattison, Sr., Sebring, FL (US); Michael Brian Mattison, Jr., Sebring, FL (US)

(73) Assignee: The Gripper Shop, Inc., Sebring, FL (US)

( * ) Notice: Subject to any disclaimer, the term of this patent is extended or adjusted under 35 U.S.C. 154(b) by 300 days.

(21) Appl. No.: 18/461,730

(22) Filed: Sep. 6, 2023

Related U.S. Application Data (60) Provisional application No. 63/404,113, filed on Sep. 6, 2022.

(51) Int. Cl.
*H04M 1/72463* (2021.01)
*H04M 1/7246* (2021.01)

(52) U.S. Cl.
CPC ..... *H04M 1/72463* (2021.01); *H04M 1/7246* (2021.01)

(58) Field of Classification Search
CPC ........................ H04M 1/72463; H04M 1/7246
See application file for complete search history.

(56) References Cited

U.S. PATENT DOCUMENTS

| | | | |
|---|---|---|---|
| 5,508,757 A | 4/1996 | Chen | |
| 7,974,084 B2 | 7/2011 | Chen et al. | |
| 9,369,170 B2 * | 6/2016 | Sorrentino | H04B 1/3888 |
| 9,596,332 B2 | 3/2017 | Gander et al. | |
| 10,146,254 B2 | 12/2018 | Codner | |
| 10,355,736 B2 | 7/2019 | Zaccaria | |
| 10,368,622 B1 | 8/2019 | Eckert | |
| 11,870,480 B2 * | 1/2024 | Landry | H04W 12/02 |
| 2006/0279916 A1 | 12/2006 | Boudreau | |
| 2017/0180984 A1 * | 6/2017 | Thomas | H04M 1/667 |
| 2019/0097669 A1 * | 3/2019 | Zaccaria | H04M 1/21 |
| 2019/0347449 A1 * | 11/2019 | Kowasic | H04M 1/667 |
| 2023/0072301 A1 * | 3/2023 | Warraiat | H04M 1/72463 |

FOREIGN PATENT DOCUMENTS

KR 102197040 12/2020

* cited by examiner

*Primary Examiner* — David Bilodeau
(74) *Attorney, Agent, or Firm* — Jason T. Daniel, Esq.; Daniel Law Offices, P.A.

(57) ABSTRACT

A smartphone privacy system for a smartphone comprising an upper portion positioned against atop the smartphone, where the upper portion includes an upper bar, where the upper bar includes an upper cover slot to receive the top end of the smartphone; and an upper body portion coupled to an end of the upper bar, where the upper body portion is rotatably configurable to receive the upper bar; a lower portion positioned against a bottom of the smartphone, where the lower portion includes: a lower bar, where the lower bar includes a lower cover slot to receive the bottom of the smartphone; and a lower body portion coupled to an end of the lower bar, where the lower body portion is rotatably configurable to receive the lower bar; wherein the upper portion and the lower portion are configurable between a first configuration and a second configuration.

19 Claims, 6 Drawing Sheets

SMARTPHONE PRIVACY SYSTEM AND METHOD OF USE

CROSS-REFERENCE TO RELATED APPLICATIONS

This application claims the benefit of U.S. Provisional Patent Application Ser. No. 63/404,113, filed on Sep. 6, 2022, which is incorporated by reference herein in its entirety.

FIELD OF THE INVENTION

The present invention relates generally to a privacy system, and more particularly, to a smartphone privacy system.

BACKGROUND OF THE INVENTION

A mobile device (or handheld computer) is a computer small enough to hold and operate in the hand. Typically, any handheld computer device will have an LCD or OLED flat screen interface, providing a touchscreen interface with digital buttons and keyboard or physical buttons along with a physical keyboard. Many such devices can connect to the Internet and interconnect with other devices such as car entertainment systems or headsets via Wi-Fi, Bluetooth, cellular networks or near field communication (NFC). Integrated cameras, the ability to place and receive voice and video telephone calls, video games, and Global Positioning System (GPS) capabilities are common. Power is typically provided by a lithium-ion battery. Mobile devices may run mobile operating systems that allow third-party applications to be installed and run.

Early smartphones were joined in the late 2000s by larger, but otherwise essentially the same, tablets. Input and output is usually via a touch-screen interface. Phones/tablets and personal digital assistants may provide much of the functionality of a laptop/desktop computer but more conveniently, in addition to exclusive features. Enterprise digital assistants can provide additional business functionality such as integrated data capture via barcode, RFID and smart card readers.

By 2010, mobile devices often contained sensors such as accelerometers, magnetometers and gyroscopes, allowing detection of orientation and motion. Mobile devices may provide biometric user authentication, such as face recognition or fingerprint recognition.

There are many kinds of mobile devices, designed for different applications. The various device may include but are not limited to: mobile computers (Tablet computer, Netbook, Digital media player, Enterprise digital assistant, Graphing calculator, Handheld game console, Handheld PC, Laptop, Mobile Internet device (MID), Personal digital assistant (PDA), Pocket calculator, Portable media player, Ultra-mobile PC); mobile phones (Camera phones, Feature phones, Smartphones, Phablets); digital cameras (Digital camcorder, Digital still camera (DSC), Digital video camera (DVC), Front-facing camera); pagers; personal navigation device (PND); wearable computers (Calculator watch, Smartwatch, Head-mounted display); smart cards; mobile accessories include any hardware that is not integral to the operation of a mobile smartphone as designed by the manufacturer. Cases, which are designed to attach to, support, or otherwise hold a smartphone, are popular accessories. Case measures are based on the display inches (e.g. 5 inch display). There are different types; pouches and sleeves; holsters; shells; skins; fitted cases; bumpers; flip cases and wallets; screen protection and body films; drop and shock protection; leather cases; cases with integrated kick stands; and battery cases.

However, current smartphones as well their cases do not provide strong privacy for a user when a camera and a microphone are accidentally activated, and thus it might lead to several consequences; for example, a user might experience that a phone giving targeted ads after discussing a product or store with friends or family of the user. Accordingly, there is need for a solution to at least one of the aforementioned problems.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention is directed to a smartphone privacy system comprising;
  an upper portion positioned against a top end of the smartphone, where the upper portion may include: an upper bar positioned atop the top end of the smartphone, where the upper bar may include an upper cover slot to receive the top end of the smartphone; and an upper body portion may be coupled to an end of the upper bar, where the upper body portion may be rotatably configurable to receive the upper bar;
  a lower portion positioned against a bottom end of the smartphone, where the lower portion may include: a lower bar positioned against the bottom end of the smartphone, where the lower bar may include a lower cover slot to receive the bottom end of the smartphone; and a lower body portion may be coupled to an end of the lower bar, where the lower body portion may be rotatably configurable to receive the lower bar;
  wherein the upper portion and the lower portion may be configurable between a first configuration and a second configuration, where the first configuration may position the upper bar within the upper body portion against the top end of the smartphone to cover a camera of the smartphone, and the lower bar within the lower body portion against the bottom end of the smartphone to cover a microphone of the smartphone; and where the second configuration may position the upper bar against the top end of the smartphone and the lower bar against the bottom end of the smartphone, and the upper body portion against a side of the smartphone and the lower body portion against the side of the smartphone.

In another aspect of the invention the upper bar and the upper body portion may be coupled with a hinge, where the hinge may rotate within a pivot slot within the upper body portion.

In another aspect of the invention, the upper body portion may include an upper receiver and wherein the lower body portion may include a lower receiver, where each the upper receiver and the lower receiver may be positioned against the side of the smartphone when in the second configuration.

In another aspect of the invention, the upper bar may include an upper bumper at an end of the upper bar, and wherein the lower bar may include a lower bumper at an end of the lower bar, where the upper bumper and the lower bumper may be adjacent to the top end of the smartphone.

In another aspect of the invention, the upper bar and the upper bumper may be coupled together via an upper sliding rail, and wherein the lower bar and the lower bumper may be coupled together via a lower sliding rail, where the upper sliding rail and the lower sliding rail may enable the upper bumper and the lower bumper respectively to adjust to a width of the smartphone.

In another aspect of the invention, the upper bumper may include an upper lock button which may releasably fasten into an upper receiving hole to secure the upper body portion against the upper bar in the first configuration, and wherein the lower bumper may include a lower lock button which may releasably fasten into a lower receiving hole to secure the lower body portion against the lower bar in the first configuration.

In another aspect of the invention, the upper bumper may include an upper internal spring, and wherein the lower bumper may include a lower internal spring.

In another aspect of the invention, the upper body portion and the upper bar may be coupled by an upper hinge within an upper pivot slot within the upper body portion, and wherein the lower body portion and the lower bar may be coupled by a lower hinge within a lower pivot slot within the lower body portion.

In another aspect of the invention, the upper body portion may be coupled to an upper lateral end by an upper adjustment bar, and wherein the lower body portion may be coupled to a lower lateral end by a lower adjustment bar.

In another aspect of the invention, the upper lateral end may include an upper end button, and wherein the lower lateral end may include a lower end button.

In another aspect of the invention, the upper body portion may include a set of upper grip indentions, and wherein the lower body portion may include a set of lower grip indentions.

In another aspect of the invention, the set of upper grip indentions may include an upper grip cushion, and wherein the set of lower grip indentions may include a lower grip cushion.

In another aspect of the invention, the upper grip cushion and the lower grip cushion may be made from a silicone material.

In another aspect of the invention, the upper body portion may include a pair of upper pads positioned within the upper body portion to secure the upper bar within the upper body portion when in the first configuration, and wherein the lower body portion may include a pair of lower pads positioned within the lower body portion to secure the lower bar within the lower body portion when in the first configuration.

In another aspect of the invention, the pair of upper pads and the pair of lower pads may be made from foam.

A method of use for a smartphone privacy system, where the method may comprise the steps of: attaching an upper bar of the smartphone privacy system along an upper end of a smartphone; attaching a lower bar of the smartphone privacy system along a lower end of the smartphone; fitting an upper body portion to the upper body portion, where the upper body portion is rotatably coupled to the upper bar; fitting a lower body portion to the lower body portion, where the lower body portion is rotatably coupled to the lower bar; positioning the upper body portion in front of a camera of the smartphone; and positioning the lower body portion over a microphone of the smartphone where when the upper body portion is in front of the camera and the lower body portion is over the microphone the smartphone privacy system is in a first configuration.

The method may further comprise the step of positioning the upper body portion against a first side of the smartphone and positioning the lower body portion against the first side of the smartphone, where when the upper body portion and the lower body portion are positioned against the first side of the smartphone the smart phone privacy system is in a second configuration.

The method may further comprise the step of adjusting the upper bar against the upper end of the smartphone by sliding an upper bumper coupled to the upper bar by an upper sliding rail, and adjusting the lower bar against the lower end of the smartphone by sliding a lower bumper coupled to the lower bar by a lower sliding rail.

The method may further comprise the step of securing the upper body portion against the upper bar by fastening an upper lock button on the bumper within an upper receiving hole on the upper body portion, and securing the lower body portion against the lower bar by fastening a lower lock button of the lower bumper within a lower receiving hole on the lower body portion.

In another aspect of the present invention a smartphone privacy system to engage around a smartphone may comprise:
  an upper portion may be positioned against a top end of the smartphone, where the upper portion may include:
    an upper bar may be positioned atop the top end of the smartphone, where the upper bar may include an upper cover slot to receive the top end of the smartphone;
    an upper body portion may be coupled to an end of the upper bar, where the upper body portion may be rotatably configurable to receive the upper bar; and
    an upper hinge to couple the upper bar to the upper body portion;
  a lower portion may be positioned against a bottom end of the smartphone, where the lower portion may include:
    a lower bar may be positioned against the bottom end of the smartphone, where the lower bar may include a lower cover slot to receive the bottom end of the smartphone;
    a lower body portion may be coupled to an end of the lower bar, where the lower body portion is rotatably configurable to receive the lower bar; and
    a lower hinge may couple the lower bar to the lower body portion;
  wherein the upper portion and the lower portion may be configurable between a first configuration and a second configuration,
  where the first configuration may position the upper bar within the upper body portion against the top end of the smartphone to cover a camera of the smartphone, and the lower bar within the lower body portion against the bottom end of the smartphone to cover a microphone of the smartphone; and
  where the second configuration may position the upper bar against the top end of the smartphone and the lower bar against the bottom end of the smartphone, and the upper body portion against a side of the smartphone and the lower body portion against the side of the smartphone.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

These and other objects, features, and advantages of the present invention will become more readily apparent from the attached drawings and the detailed description of the preferred embodiments, which follow.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

Figure 1:
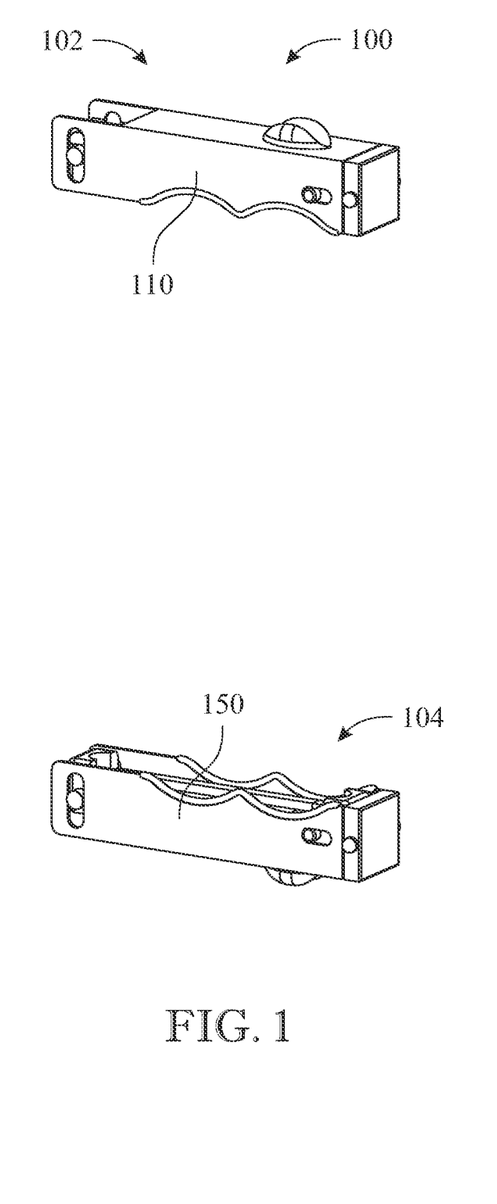
FIG. 1 presents a perspective view of a foldable smartphone privacy system in a first configuration according to an embodiment of the present invention.

Referring to FIG. 1 a perspective view of a foldable smartphone privacy system 100 is shown in a first or folded configuration according to an embodiment of the present invention. Accordingly, the smartphone privacy system 100 may comprise an upper portion 102 and a lower privacy device 104.

Figure 2:
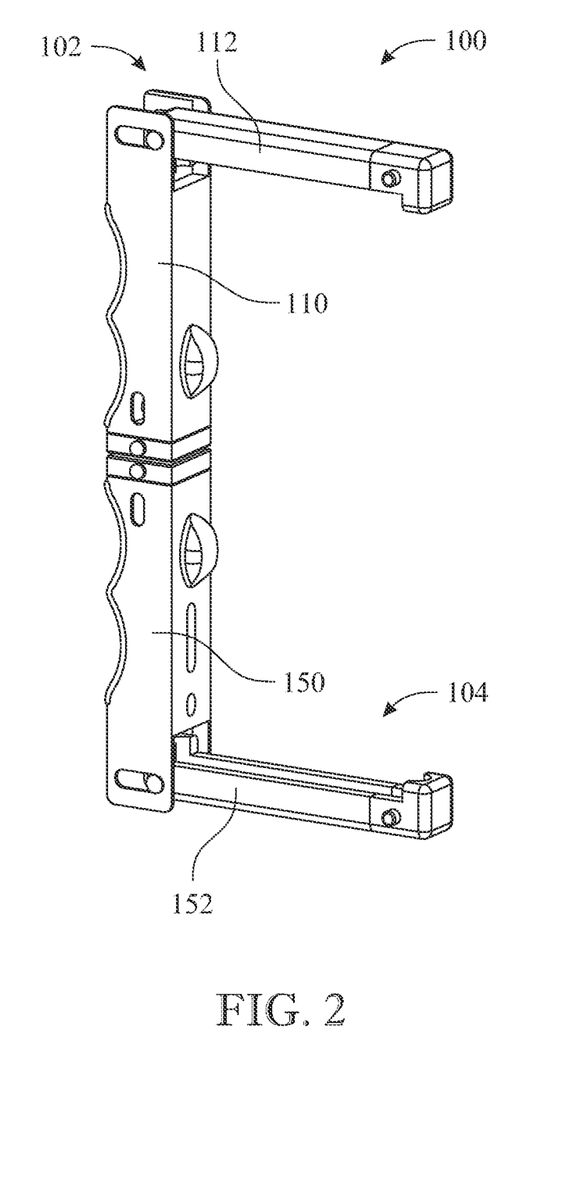
FIG. 2 presents a perspective view of a foldable smartphone privacy system in a second configuration according to an embodiment of the present invention.

Referring to FIG. 2, a perspective view of the foldable smartphone privacy system 100 is shown in a second, extended or unfolded configuration where the upper portion 102 may be positioned above the lower portion 104. The upper portion 102 may comprise an upper body portion 110 and an upper bar 112. Similarly, the lower portion 104 may comprise a lower body portion 150 and a lower bar 152. FIGS. 1 and 2 illustrate the two embodiments of the foldable smartphone privacy system 100. As will be better illustrated in FIGS. 5 and 6. In a first configuration, the upper body portion 110 may be configured atop a smartphone, and the lower body portion 150 may be positioned below the smartphone. Alternatively, in a second configuration, the upper body portion 110 may be positioned along a side of the smartphone, whereas the upper bar 112 is positioned against the top of the smartphone. Likewise, the lower body portion 150 may be positioned along the side of the smartphone, below the upper body portion 110, with the lower bar 152 resting against the bottom of the smartphone.

Figure 3:
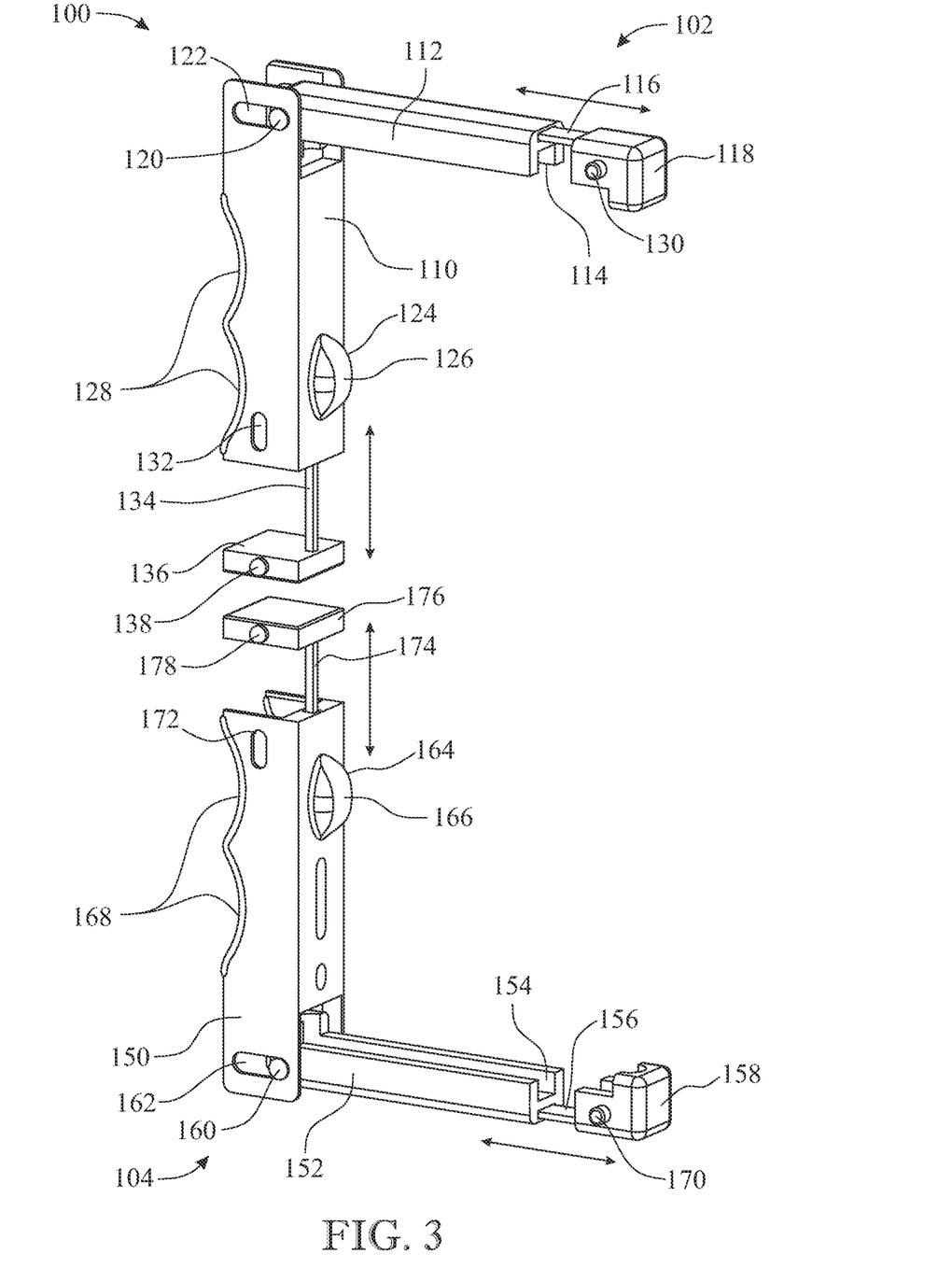
FIG. 3 presents a perspective view of a foldable smartphone privacy system in an expanded configuration according to an embodiment of the present invention.

Referring to FIG. 3, presents a perspective view of the foldable smartphone privacy system 100 in an expanded form according to an embodiment of the present invention. In this figure, the foldable smartphone privacy system 100 is illustrated in the second embodiment, where the upper body portion 110 and the lower body portion 150 may be positioned vertically against a side of the smartphone. Extending from the upper body portion 110 and the lower body portion 150 may be the upper bar 112 and lower bar 152 respectively. The upper bar 112 may pivot around the upper body portion 110 at an upper hinge 120 which may rotate within an upper pivot slot 122. The upper hinge 120 may allow the upper bar 112 to move and rotate between the first configuration and the second configuration. The lower body portion 150 may also include a lower hinge 160 which rotates within a lower pivot slot 162 in similar fashion as the upper body portion 110.

The upper bar 112 may include an upper cover slot 114 to receive the upper end of the smartphone. The upper cover slot 114 may be U-shaped to securely rest atop the smartphone, thereby preventing sliding or slipping during use. Extending from the upper bar 112, and positioned adjacent to the upper cover slot 114, may be an upper sliding rail 116 which may connect the upper bar 112 to an upper bumper 118. The upper bumper 118 may be positioned opposite the upper hinge 120 at an end of the upper bar 112. The upper sliding rail 116 may slide in and out of the upper bar 112, to position the upper bumper 118 towards or away from the upper bar 112 to secure the smartphone within the upper portion 102 of the smartphone privacy system 100.

Similarly, the lower bar 152 may include a lower cover slot 154 to receive the lower end of the smartphone. The lower cover slot 154 may be U-shaped to securely receive the smartphone. Extending from the lower bar 152, and positioned adjacent to the lower cover slot 154, may be a lower sliding rail 156 which may connect the lower bar 152 to a lower bumper 158. The lower bumper 158 may be positioned opposite the lower hinge 160 at an end of the lower bar 152. The lower sliding rail 156 may slide in and out of the lower bar 152, to position the lower bumper 158 towards or away from the lower bar 152 to secure the smartphone within the lower portion 104 of the foldable smartphone privacy system 100.

Figure 6:
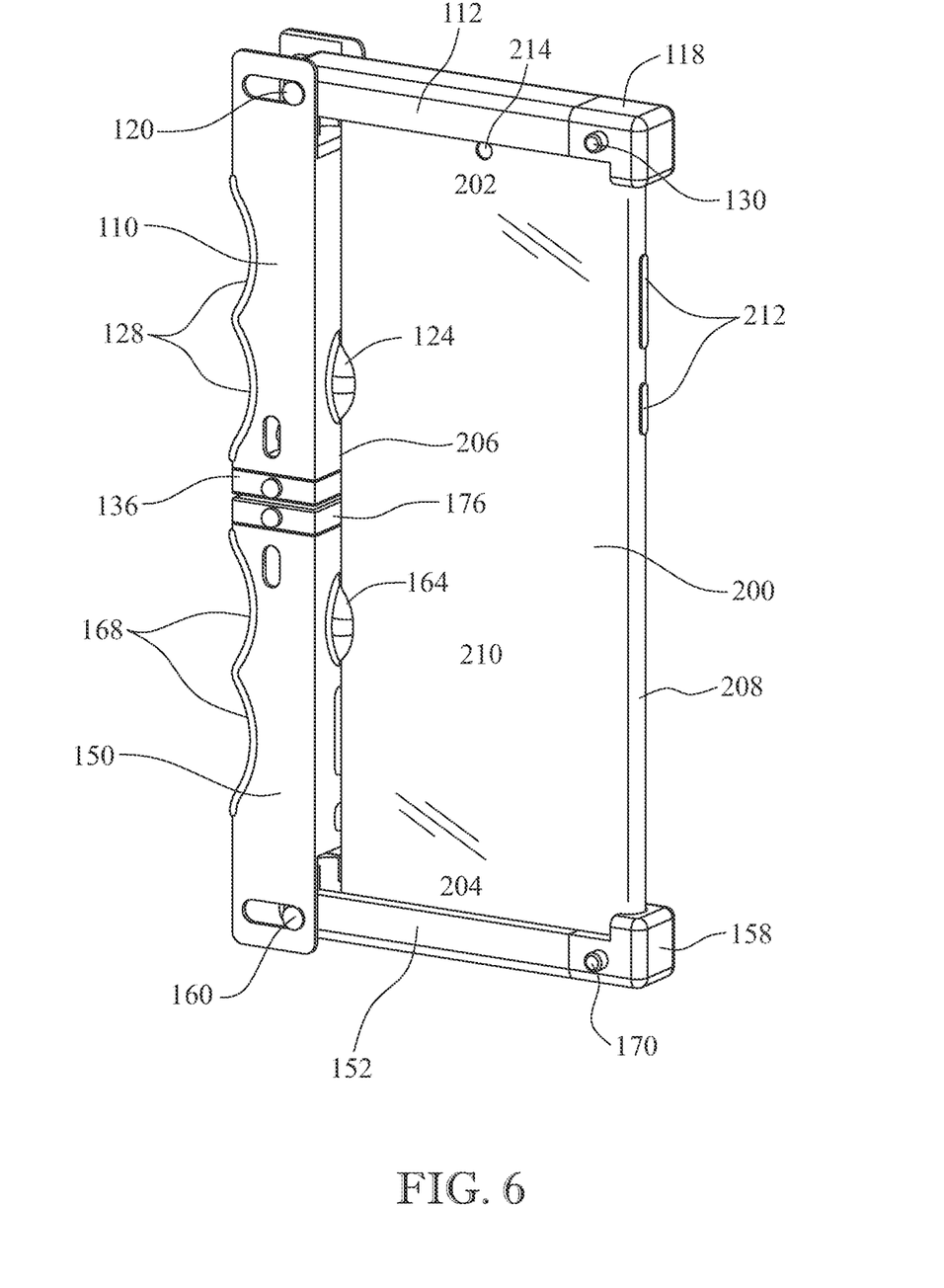
FIG. 6 presents a perspective view of a foldable smartphone privacy system in a second configuration engaged with a smartphone according to the present invention.

The upper body portion 110 may include an upper receiver 124, where the upper receiver 124 is positioned against the lateral edge of the smartphone in the second configuration (see FIG. 6). The upper receiver 124 may include an upper receiver slot 126 to receive and position the lateral edge of the smartphone against the upper body portion 110. Positioned on an opposite side of the upper body portion 110 from the upper receiver 124 may be a set of upper grip indentions 128. The upper grip indentions 128 may provide a comfortable spot for a user to rest their fingers when holding the smartphone within the smartphone privacy system 100.

The upper body portion 110 may include an upper lateral end 136 which may slide back and forth against the upper body portion 110 via an upper adjustment bar 134. The upper adjustment bar 134 may separate the upper lateral end 136 from the upper body portion 110 as needed to correspond to the height of the smartphone (see FIG. 6). Positioned on a top end of the upper lateral end 136 may be an upper end button 138. The upper end button 138 may provide additional grip to adjust and position the upper lateral end 136 against the upper body portion 110.

The lower portion 104 may be assembled in a mirrored arrangement as the upper portion 102, wherein the parts, arrangement, and assembly of the lower portion 104 are the same as the upper portion 102 simply mirrored. Accordingly, the lower body portion 150 may include a lower receiver 164, where the lower receiver 164 is positioned against the lateral edge of the smartphone, below the upper body portion 110, in the second configuration (see FIG. 6). The lower receiver 164 may include a lower receiver slot 166 to receive and position the lateral edge of the smartphone against the lower body portion 150. Positioned on an opposite side of the lower body portion 150 from the lower receiver 164 may be a set of lower grip indentions 168. The lower grip indentions 168 may provide a comfortable spot for a user to rest their fingers when holding the smartphone within the foldable smartphone privacy system 100.

The lower body portion 150 may include a lower lateral end 176 which may slide back and forth against the lower body portion 150 via a lower adjustment bar 174. The lower adjustment bar 174 may separate the lower lateral end 176 from the lower body portion 150 as needed to correspond to the height of the smartphone (see FIG. 6). Positioned on a top end of the lower lateral end 176 may be a lower end button 178. The lower end button 178 may provide additional grip to adjust and position the lower lateral end 176 against the lower body portion 150.

Figure 4:
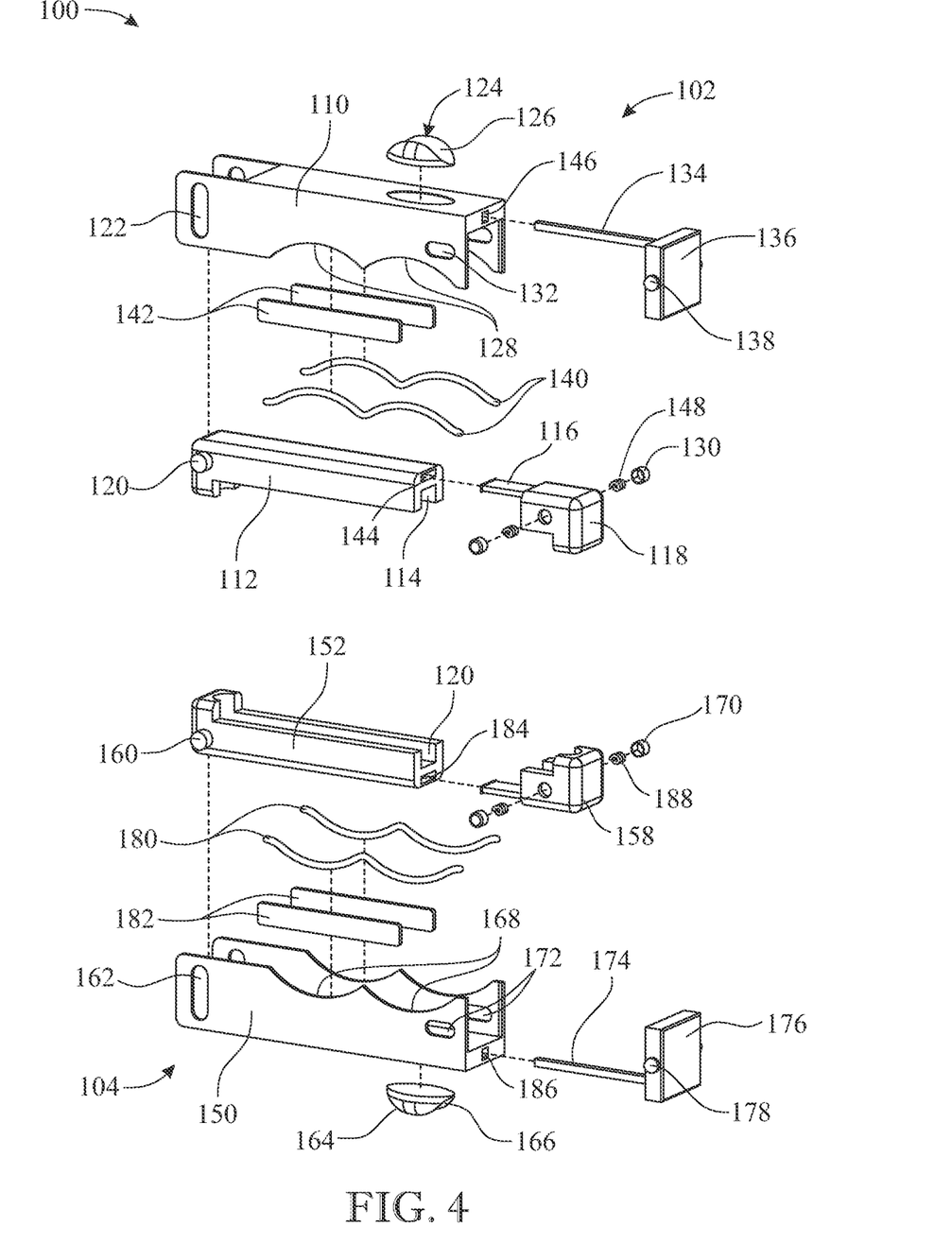
FIG. 4 presents an exploded view of a foldable smartphone privacy system according to an embodiment of the present invention.

Referring to FIG. 4, an exploded view of the foldable smartphone privacy system 100 is shown in the first configuration according to the present invention. The upper portion 102 is positioned atop and facing the lower portion 104. The upper body portion 110 may be positioned over the upper bar 112. When assembled, the upper bar 112 and upper bumper 118 may fit into the upper body portion 110. In the first configuration, the upper bar 112 may be completely surrounded by the upper body portion 110 to where the upper lateral end 136 is positioned adjacent to the upper bumper 118. The upper adjustment bar 134 may slide within an upper guide opening 146 to move the upper lateral end 136 towards the upper bumper 118 so that the pieces are held snuggly against each other and the top edge of the smartphone.

Within the upper bar 112 may be an upper bar opening 144. The upper bar opening 144 may enable the upper sliding rail 116 to adjust the position of the upper bumper 118 adjacent to the upper bar 112. The upper lock button 130 of the upper bumper 118 may comprise a pair of upper lock buttons 130. Further, the upper lock button 130 may include an upper internal spring 148, where an internal spring 148 is provided for each upper lock button 130. The upper bumper 118 may have an upper lock button 130 on each lateral side, each with an upper internal spring 148. The internal spring 148 may enable the upper lock button 130 to compress within the upper bumper 118, thus creating a lock-release pin mechanism. During use, in the folded configuration, the upper lock buttons 130 may snap into a pair upper receiving holes 132 of the upper body portion 110 to lock the upper bar 112 into the upper body portion 110.

A pair of upper pads 142 may be coupled within the inner, lateral walls of the upper body portion 110. The pair of upper pads 142 may fasten the upper bar 112 within the upper body portion 110 to further secure the foldable smartphone privacy system 100 in the folded configuration. The pair of upper pads 142 may be made from one of at least foam, plastic, silicone or the like. Coupled along an edge of the pair of upper grip indentions 128 may be an upper grip cushion 140 to provide a comfortable feel against the user's fingers. The material of the upper grip cushion 140 may be rubber or silicone or similar compressible material.

Likewise, the lower portion 104 provides a similar positioning where the lower body portion 150 may be positioned below the lower bar 152 so that the lower bar 152 may be rest within the lower body portion 150 in the folded/first configuration. When assembled, the lower bar 152 and lower bumper 158 may fit into the lower body portion 150. In the first configuration, the lower bar 152 may be completely surrounded by the lower body portion 150 to where the lower lateral end 176 is positioned adjacent to the lower bumper 158. The lower adjustment bar 174 may slide within a lower guide opening 186 to move the lower lateral end 176 towards the lower bumper 158 so that the pieces are held snuggly against each other and the bottom edge of the smartphone.

Similar to the upper portion 102, the lower bar 112 of the lower portion 104 may include a lower bar opening 184. The lower bar opening 184 may enable the lower sliding rail 156 to adjust the position of the lower bumper 158 adjacent to the lower bar 152. The lower lock button 170 of the lower bumper 158 may comprise a pair of lower lock buttons 170. Further, the lower lock button 170 may include a lower internal spring 188, where a lower internal spring 188 is provided for each lower lock button 170. The lower bumper 158 may have a lower lock button 170 on each lateral side, each with a lower internal spring 188. The lower internal spring 188 may enable the lower lock button 170 to compress within the lower bumper 158, thus creating a lock-release pin mechanism. During use, in the folded configuration, the lower lock buttons 170 may snap into a pair lower receiving holes 172 of the lower body portion 150 to lock the lower bar 152 into the lower body portion 150.

A pair of lower pads 182 may be coupled within the inner, lateral walls of the lower body portion 150. The pair of lower pads 182 may fasten the lower bar 152 within the lower body portion 150 to further secure the foldable smartphone privacy system 100 in the folded configuration. The pair of lower pads 142 may be made from one of at least foam, plastic, silicone or the like. Coupled along an edge of the pair of lower grip indentions 168 may be a lower grip cushion 180 to provide a comfortable feel against the user's fingers. The material of the upper grip cushion 180 may be rubber or silicone or similar compressible material.

Figure 5:
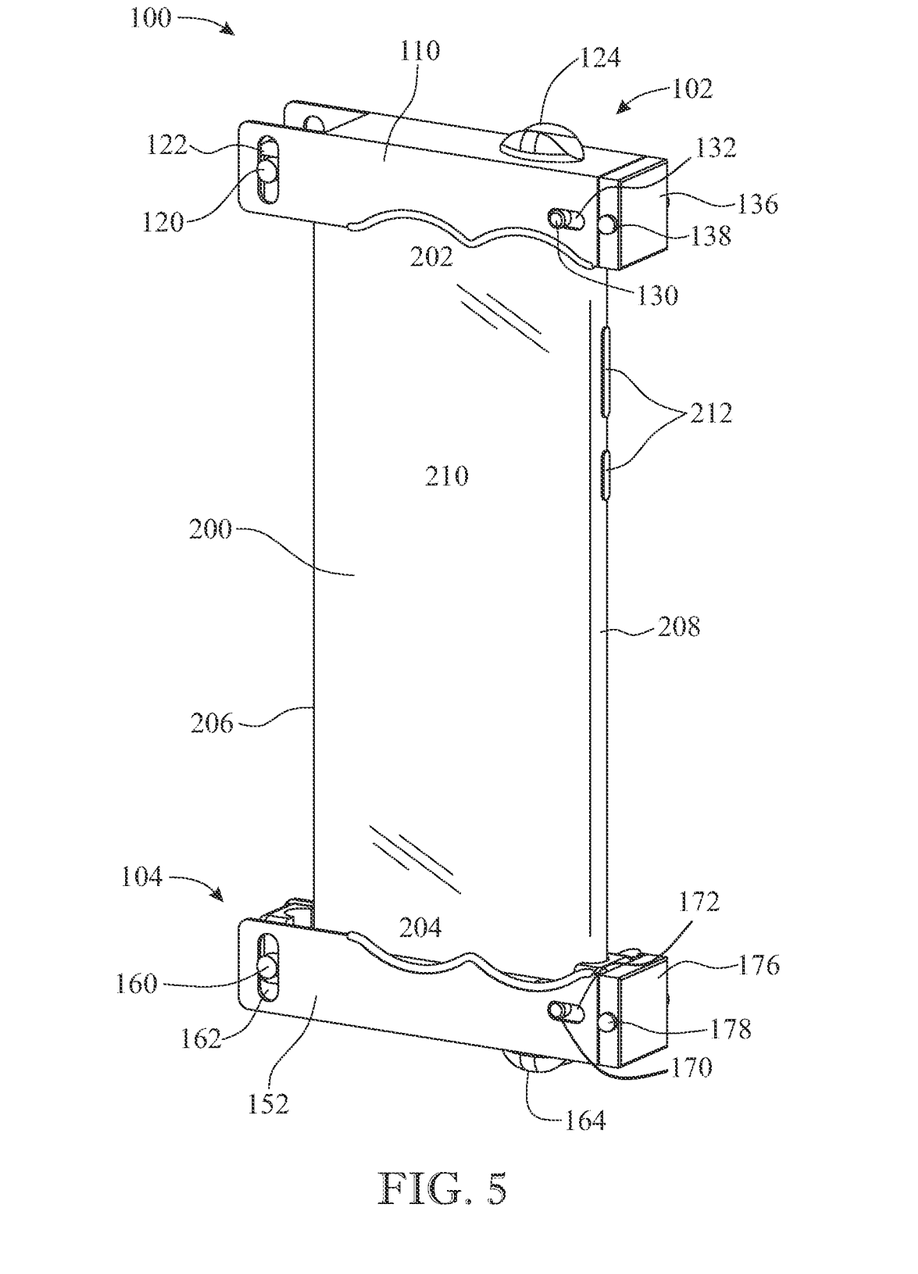
FIG. 5 presents a perspective view of a foldable smartphone privacy system in a first configuration engaged with a smartphone according to the present invention.

Referring to FIG. 5, a perspective view of the foldable smartphone privacy system 100 is in the first configuration or a folded configuration and is positioned around a smartphone 200. The smartphone 200 may comprise a top end 202, a bottom end 204, a first side 206 and a second side 208, a front face 210, and a set of operation button 212 along the second side 208. A microphone of the smartphone may be positioned along the bottom end 204. The smartphone privacy system 100 may be engaged with the top end 202 and bottom side 204 of the smartphone. The upper portion 102 may be positioned against the upper side 202, whereas the lower portion 104 may be positioned against the lower side 204 of the smartphone 200. In the folded configuration, the upper body portion 110 may cover a camera lens (shown in FIG. 6), so that the camera is blocked from use. In the folded configuration, the upper and lower inner bars are completely within the upper body portion 110 and the lower body portion 150 respectively. The top end 202 may be positioned within the upper body portion 110 whereas the bottom end 204 may be positioned within the lower body portion 150. The width of the upper portion 102 and the lower portion 104 may be adjusted via the upper bumper and upper lateral end 136 and the lower bumper and the lower lateral end 176 respectively.

Referring to FIG. 6, a perspective view of the foldable smartphone privacy system 100 is shown in the second configuration. In the second, unfolded or extended configuration the upper body portion 110 and the lower body portion 150 may be separated from the upper bar 112 and the lower bar 152 respectively to where they rest against the first side 206 of the smartphone 200. The first side 206 may be positioned within the upper receiver 124 and the lower receiver 164.

Figure 7:
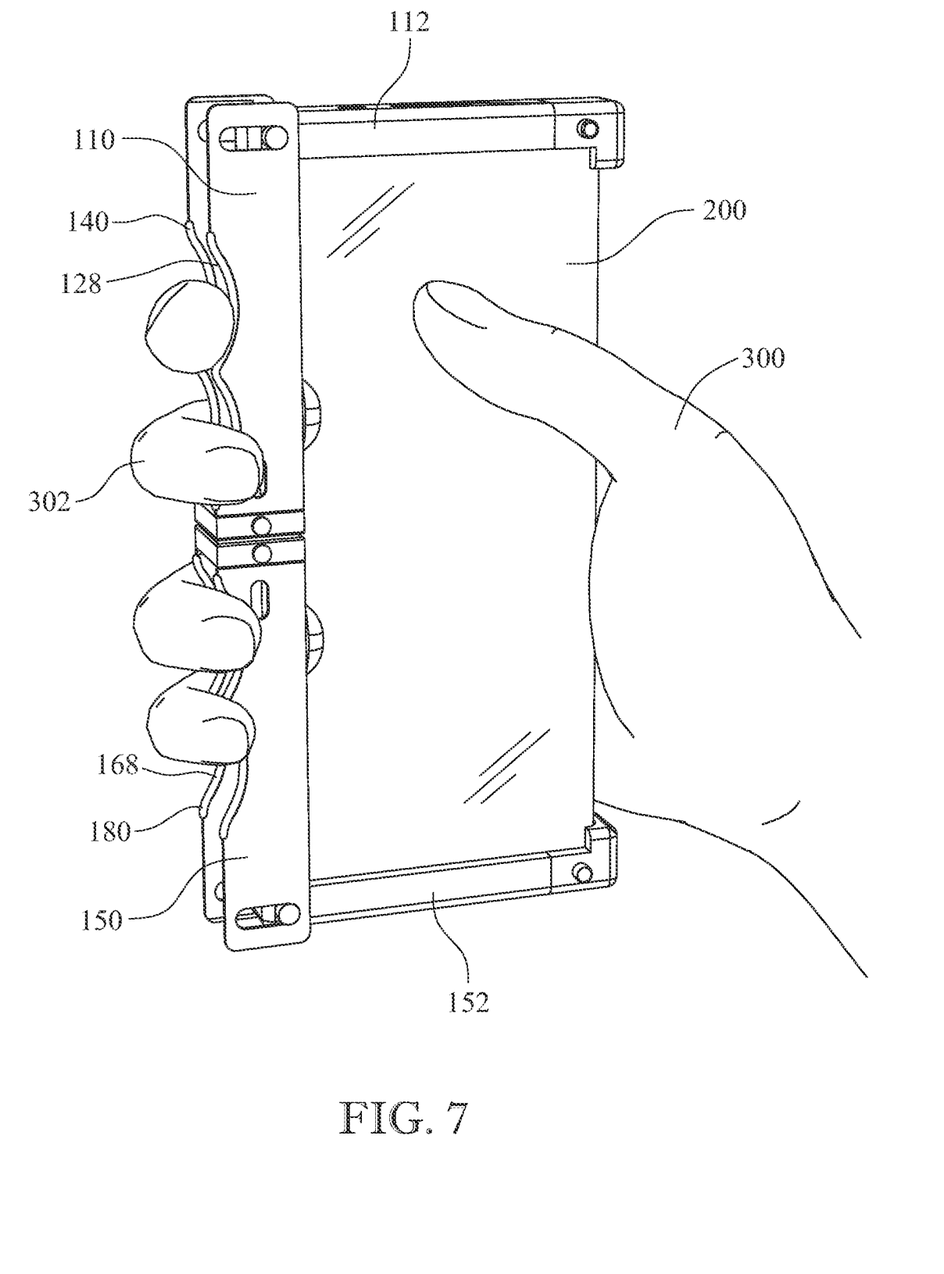
FIG. 7 presents a perspective view of a smartphone privacy system engaged with a smartphone within a user's hand according to the present invention.

Referring to FIG. 7, a perspective view of the foldable smartphone privacy system 100 is shown in the second configuration within the hand 300 of a user. The user's fingers 302 may rest comfortably against the upper grip indentions 128 and the lower grip indentions 168, where the upper grip cushion 140 and the lower grip cushion 180 may provide additional cushion and comfort against the fingers 302.

To operate, the smartphone privacy system is positioned around the smartphone in one of two configurations. In the first configuration, the upper portion may be fitted to the top end of the smartphone where the width may be adjusted via the upper sliding rail and the upper lateral adjustment bar moving the upper bumper and the upper lateral end to accommodate the top end within the upper cover slot. In kind, the lower portion may be fitted below the bottom end where the width may be adjusted via the lower sliding rail and the lower lateral adjustment bar, moving the lower bumper and the lower lateral end to accommodate the bottom end within the lower cover slot. In the folded configuration the camera of the smartphone is covered thus non-operational.

The upper body portion may be locked in the folded configuration with the upper lock button positioned within the upper receiving hole. This may prevent the upper body portion from detaching from the upper bar. Operationally, the lower portion may be locked in the folded configuration in the same way with the lower lock button positioned with the lower receiving hole.

To remove the privacy feature of the smartphone privacy system, the upper body portion may rotate around the upper hinge within the upper pivot slot to be positioned adjacent to the first side of the smartphone. The first side of the smartphone may be fitted into the upper receiver. Additionally, the lower body portion may rotate about the lower hinge within the lower pivot slot to be positioned adjacent to the first side of the smartphone and below the upper body portion. The lower receiver may also be fitted against the first side of the smartphone.

According to an embodiment of the present invention, in the folded configuration or privacy configuration, the upper portion and the lower portion may be configured to cover the camera and the microphone of a smartphone so as to allow privacy for a user when not on the phone while to still let sounds from a speaker of a smartphone come therethrough for a user to still hear through the speaker.

According to an embodiment of the present invention, the upper portion and the lower portion may help keep the privacy intact by preventing people from watching or listening to a user from a smartphone via physically blocking input from the camera and microphone of a smartphone.

According to an embodiment of the present invention, the upper portion and the lower portion may be configured to be further engaged with a lateral side, either a left side or a right side, of a smartphone for left-handedness or right-handedness.

According to an embodiment of the present invention, the upper portion and the lower portion may be configured to provide gripping function for a smartphone.

According to an embodiment of the present invention, the upper portion and the lower portion may fit over a smartphone, so they have physical protection as well as the privacy protection for it.

According to an embodiment of the present invention, the upper portion and the lower portion may be adjustable so as to expand or contract to fit different size phones with varied widths and heights.

According to an embodiment of the present invention, the upper portion and the lower portion may be made of plastic and silicone materials.

According to an embodiment of the present invention, the upper body portion and the lower body portion may be telescopic so as to expand or contract to fit varied widths of different size phones.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A smartphone privacy system to engage around a smartphone comprising: an upper portion positioned against a top end of the smartphone, where said upper portion includes: an upper bar positioned atop the top end of the smartphone, where said upper bar includes an upper cover slot to receive the top end of the smartphone; and an upper body portion coupled to an end of said upper bar, where said upper body portion is rotatably configurable to receive said upper bar; a lower portion positioned against a bottom end of the smartphone, where said lower portion includes: a lower bar positioned against the bottom end of the smartphone, where said lower bar includes a lower cover slot to receive the bottom end of the smartphone; and a lower body portion coupled to an end of said lower bar, where said lower body portion is rotatably configurable to receive said lower bar; wherein said upper portion and said lower portion are configurable between a first configuration and a second configuration, where the first configuration positions said upper bar within said upper body portion against the top end of the smartphone to cover a camera of the smartphone, and said lower bar within said lower body portion against the bottom end of the smartphone to cover a microphone of the smartphone; and where the second configuration positions said upper bar against the top end of the smartphone and said lower bar against the bottom end of the smartphone, and said upper body portion against a side of the smartphone and said lower body portion against the side of the smartphone, wherein said upper body portion and said upper bar are coupled by an upper hinge within an upper pivot slot located at a corner within said upper body portion, and wherein said lower body portion and said lower bar are coupled by a lower hinge within a lower pivot slot located at a corner within said lower body portion, wherein the upper body portion rotates around the upper pivot slot and the lower body portion rotates around the lower pivot slot.

2. The smartphone privacy system according to claim 1, wherein said upper bar and said upper body portion are coupled with a hinge, where said hinge rotates within a pivot slot within said upper body portion.

3. The smartphone privacy system according to claim 1, wherein said upper body portion includes an upper receiver and wherein said lower body portion includes a lower receiver, where each said upper receiver and said lower receiver are positioned against the side of the smartphone when in the second configuration.

4. The smartphone privacy system according to claim 1, wherein said upper bar includes an upper bumper at an end of said upper bar, and wherein said lower bar includes a lower bumper at an end of said lower bar, where said upper bumper and said lower bumper are adjacent to the top end of the smartphone.

5. The smartphone privacy system according to claim 4, wherein said upper bar and said upper bumper are coupled together via an upper sliding rail, and wherein said lower bar and said lower bumper are coupled together via a lower sliding rail, where said upper sliding rail and said lower sliding rail enable said upper bumper and said lower bumper respectively to adjust to a width of the smartphone.

6. The smartphone privacy system according to claim 4, wherein said upper bumper includes an upper lock button which releasably fastens into an upper receiving hole to secure said upper body portion against said upper bar in said first configuration, and wherein said lower bumper includes a lower lock button which releasably fastens into a lower receiving hole to secure said lower body portion against said lower bar in said first configuration.

7. The smartphone privacy system according to claim 6, wherein said upper bumper includes an upper internal spring, and wherein said lower bumper includes a lower internal spring.

8. The smartphone privacy system according to claim 1, wherein said upper body portion is coupled to an upper lateral end by an upper adjustment bar, and wherein said lower body portion is coupled to a lower lateral end by a lower adjustment bar.

9. The smartphone privacy system according to claim 8, wherein said upper lateral end includes an upper end button, and wherein said lower lateral end includes a lower end button.

10. The smartphone privacy system according to claim 1, wherein said upper body portion includes a set of upper grip indentions, and wherein said lower body portion includes a set of lower grip indentions.

11. The smartphone privacy system according to claim 10, wherein said set of upper grip indentions includes an upper grip cushion, and wherein said set of lower grip indentions includes a lower grip cushion.

12. The smartphone privacy system according to claim 11, wherein said upper grip cushion and said lower grip cushion are made from a silicone material.

13. The smartphone privacy system according to claim 1, wherein said upper body portion includes a pair of upper pads positioned within said upper body portion to secure said upper bar within said upper body portion when in said first configuration, and wherein said lower body portion includes a pair of lower pads positioned within said lower body portion to secure said lower bar within said lower body portion when in said first configuration.

14. The smartphone privacy system according to claim 1, wherein said pair of upper pads and said pair of lower pads are made from foam.

15. A method of use for a smartphone privacy system comprising the steps of: attaching an upper bar of said smartphone privacy system along an upper end of a smartphone; attaching a lower bar of said smartphone privacy system along a lower end of the smartphone; fitting an upper body portion to said upper body portion, where said upper body portion is rotatably coupled to said upper bar; fitting a lower body portion to said lower body portion, where said lower body portion is rotatably coupled to said lower bar; positioning said upper body portion in front of a camera of the smartphone; and positioning said lower body portion over a microphone of the smartphone where when said upper body portion is in front of the camera and said lower body portion is over the microphone the smartphone privacy system is in a first configuration, wherein said upper body portion and said upper bar are coupled by an upper hinge within an upper pivot slot located at a corner within said upper body portion, and wherein said lower body portion and said lower bar are coupled by a lower hinge within a lower pivot slot located at a corner within said lower body portion, wherein the upper body portion rotates around the upper pivot slot and the lower body portion rotates around the lower pivot slot.

16. The method of use for the smartphone privacy system of claim 15, further comprising the step of positioning said upper body portion against a first side of the smartphone, and positioning said lower body portion against the first side of the smartphone, where when said upper body portion and said lower body portion are positioned against the first side of the smartphone the smart phone privacy system is in a second configuration.

17. The method of use for the smartphone privacy system of claim 15, further comprising the step of adjusting said upper bar against the upper end of the smartphone by sliding an upper bumper coupled to said upper bar by an upper sliding rail, and adjusting said lower bar against the lower end of the smartphone by sliding a lower bumper coupled to said lower bar by a lower sliding rail.

18. The method of use for the smartphone privacy system of claim 17, further comprising the step of securing said upper body portion against said upper bar by fastening an upper lock button on said bumper within an upper receiving hole on said upper body portion, and securing said lower body portion against said lower bar by fastening a lower lock button of said lower bumper within a lower receiving hole on said lower body portion.

19. A smartphone privacy system to engage around a smartphone comprising: an upper portion positioned against a top end of the smartphone, where said upper portion includes: an upper bar positioned atop the top end of the smartphone, where said upper bar includes an upper cover slot to receive the top end of the smartphone; an upper body portion coupled to an end of said upper bar, where said upper body portion is rotatably configurable to receive said upper bar; and an upper hinge to couple said upper bar to said upper body portion; a lower portion positioned against a bottom end of the smartphone, where said lower portion includes: a lower bar positioned against the bottom end of the smartphone, where said lower bar includes a lower cover slot to receive the bottom end of the smartphone; a lower body portion coupled to an end of said lower bar, where said lower body portion is rotatably configurable to receive said lower bar; and a lower hinge to couple said lower bar to said lower body portion; wherein said upper portion and said lower portion are configurable between a first configuration and a second configuration, where the first configuration positions said upper bar within said upper body portion against the top end of the smartphone to cover a camera of the smartphone, and said lower bar within said lower body portion against the bottom end of the smartphone to cover a microphone of the smartphone; and where the second configuration positions said upper bar against the top end of the smartphone and said lower bar against the bottom end of the smartphone, and said upper body portion against a side of the smartphone and said lower body portion against the side of the smartphone, wherein said upper body portion and said upper bar are coupled by an upper hinge within an upper pivot slot located at a corner within said upper body portion, and wherein said lower body portion and said lower bar are coupled by a lower hinge within a lower pivot slot located at a corner within said lower body portion, wherein the upper body portion rotates around the upper pivot slot and the lower body portion rotates around the lower pivot slot.

\* \* \* \* \*